3,025,306
PROCESS FOR THE PRODUCTION OF EPSILON-CAPROLACTONES AND CARBOXYLIC ACIDS
Howard R. Guest, Charleston, and Ben W. Kiff, Ona, W. Va., assignors to Union Carbide Corporation, a corporation of New York
No Drawing. Filed May 31, 1960, Ser. No. 32,595
10 Claims. (Cl. 260—343)

This invention relates to a novel process for the production of epsilon-caprolactones and carboxylic acids.

More specifically, this invention is concerned with a process in which a cyclohexanone is reacted with an oxygen containing gas and an aldehyde to yield an epsilon-caprolactone and a carboxylic acid.

The concept of producing epsilon-caprolactone from cyclohexanone is not a new one. Much attention has been given in the art to arrive at a process to accomplish this. According to heretofore customary practices, efforts have been concerned with the use of peroxy compounds such as monopersulfuric acid; mixtures of hydrogen peroxide and acetic acid; anhydrous hydrogen peroxide in hydrogen fluoride; and perbenzoic acid as oxidants. However, the results obtained by these practices were very poor since at best, only very small amounts of the lactone were obtained.

In a copending application by Phillips et al., S.N. 548,754, filed November 23, 1955, a process is disclosed employing the use of peracetic acid. While the results obtained by this process are excellent, there are certain disadvantages. The use of peracetic acid is a relatively expensive way of inserting oxygen into a molecule. Additionally, there are certain hazards present when using peracetic acid and costly installations are required to control these hazards. Accordingly, it is an object of this invention to provide an economical, efficient and safe method for making epsilon-caprolactones and carboxylic acids.

The instant process has many important advantages over the prior art methods. It utilizes the cheapest oxidizing agent known—oxygen. It provides a process which is free from the hazards present when peroxidic compounds are mixed with organic compounds. Additionally, it provides a manner by which two useful compounds are produced, a lactone and an acid. Thus, depending on the market position, the aldehyde can be chosen so as to yield the most advantageous carboxylic acid.

The instant invention can be illustrated by the following equation:

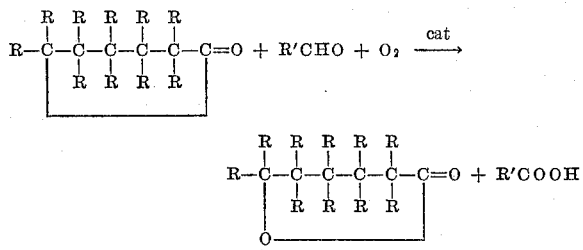

Where R represents hydrogen atoms and alkyl groups having from 1–30 carbon atoms; and R' represents hydrogen atoms, alkyl groups having from 1 to 30 carbon atoms and aromatic groups.

Specific examples of the cyclohexanones include cyclohexanone, 2-methylcyclohexanone, 3-methylcyclohexanone, 4-methylcyclohexanone, 2-ethylcyclohexanone, 3,3,5-trimethylcyclohexanone.

Specific examples of the aldehydes which can be used in the novel process of our invention include formaldehyde, acetaldehyde, propionaldehyde, isobutyraldehyde, valeraldehyde, hexaldehyde, 2-ethylbutyraldehyde benzaldehyde, tolualdehyde, phthalaldehyde.

Among the caprolactones produced by the instant process are:

Epsilon-caprolactone;
Alpha-methyl-epsilon-caprolactone;
Beta-methyl-epsilon-caprolactone;
Gamma-methyl-epsilon-caprolactone;
Delta-methyl-epsilon-caprolactone;
Alpha-ethyl-epsilon-caprolactone;
Beta-ethyl-epsilon-caprolactone;
Gamma-ethyl-epsilon-caprolactone-
Delta-ethyl-epsilon-caprolactone;
Alpha,beta-dimethyl-epsilon-caprolactone;
Alpha,gamma-dimethyl-epsilon-caprolactone;
Alpha,delta-dimethyl-epsilon-caprolactone;
Beta,gamma-dimethyl-epsilon-caprolactone;
Beta,delta-dimethyl-epsilon-caprolactone;
Gamma,delta-dimethyl-epsilon-caprolactone;
Beta,beta,delta-trimethyl-epsilon-caprolactone;
Beta,delta,delta-trimethyl-epsilon-caprolactone;
Alpha,beta,gamma-trimethyl-epsilon-caprolactone;
Alpha,beta,delta-trimethyl-epsilon-caprolactone;
Beta,gamma,delta-trimethyl-epsilon-caprolactone;
Alpha-ethyl-beta-methyl-epsilon-caprolactone;
Alpha-ethyl-gamma-methyl-epsilon-caprolactone;
Alpha-ethyl-delta-methyl-epsilon-caprolactone;
Beta-ethyl-alpha-methyl-epsilon-caprolactone;
Beta-ethyl-gamma-methyl-epsilon-caprolactone;
Beta-ethyl-delta-methyl-epsilon-caprolactone;
Gamma-ethyl-alpha-methyl-epsilon-caprolactone;
Gamma-ethyl-beta-methyl-epsilon-caprolactone;
Gamma-ethyl-delta-methyl-epsilon-caprolactone;
Delta-ethyl-alpha-methyl-epsilon-caprolactone;
Delta-ethyl-beta-methyl-epsilon-caprolactone;
Delta-ethyl-gamma-methyl-epsilon-caprolactone;
Alpha,alpha-dimethyl-epsilon-caprolactone;
Beta,beta-dimethyl-epsilon-caprolactone;
Gamma,gamma-dimethyl-epsilon-caprolactone;
Delta,delta-dimethyl-epsilon-caprolactone;
Alpha,alpha,delta-trimethyl-epsilon-caprolactone;
Beta,beta,gamma-trimethyl-epsilon-caprolactone;
Alpha,delta,delta-trimethyl-epsilon-caprolactone
Beta,beta-dimethyl-gamma-ethyl-epsilon-caprolactone;
Delta,delta-dimethyl-alpha-ethyl-epsilon-caprolactone.

Still other alkyl substituted epsilon-caprolactones can be made wherein the alkyl substituent can be, for example, propyl, isopropyl, butyl, isobutyl, tertiary butyl, amyl, isoamyl, hexyl, heptyl, octyl, nonyl, decyl, undecyl and dodecyl groups. Typical representative compounds containing higher alkyl groups are gamma-isopropyl-epsilon-caprolactone, gamma-(2-ethylhexyl)-epsilon-caprolactone.

Among the carboxylic acids produced by the process of this invention one can include acetic acid, propionic acid, butyric acid, pentanoic acid, hexanoic acid, benzoic acid, toluic acid, and phthalic acid.

It is to be understood that the carboxylic acid produced is dependent on the aldehyde employed in the process. The aldehyde employed will react to yield the corresponding acid.

In order to carry out the reaction the presence and amount of a catalyst are of the utmost criticality. The reaction will not proceed in the absence of a catalyst, to yield both the lactone and acid.

The catalysts which have found to be operable are cobalt, manganese, platinum, palladium, vanadium, ruthenium, zirconium, aluminum, antimony, beryllium and copper. The preferred catalyst is manganese.

The operable ranges for the above catalysts are from 10 to 500 parts per million, based on the weight of the total reactants for ruthenium, platinum and palladium; 10 to 200 parts per million for antimony and beryllium; 5 to 200 parts per million for vanadium; 2 to 200 parts per million for zirconium and copper; 1 to 100 parts per million for aluminum; 0.1 to 50 parts per million for cobalt; and 0.1 to 20 parts per million for manganese.

The temperature at which the reaction is conducted is also critical. The temperature range which has been found to be operable is from about 20° to about 80° C. The preferred range is from 25° C. to 50° C.

The process of this invention is conducted in the liquid phase and the order in which the reactants are introduced is not critical. Thus, the cyclohexanone, aldehyde and the catalyst may be placed in a reactor and air, oxygen or any oxygen containing gas may be bubbled in while the temperature is maintained at the desired range. A preferred manner of carrying out the reaction is to place the cyclohexanone and catalyst into a reactor and while the oxygen is being bubbled in, the aldehyde is fed dropwise over a period of time. Additional control can be obtained if the aldehyde is mixed in an inert diluent. The diluent is not critical and any one can be used so long as it is inert to the reactants. Specific examples of diluents include ethyl actate, acetic acid, benzene, hexane, ether etc.

The molar ratio of aldehyde to the cyclohexanone is not narrowly critical. The degree of conversion of the cyclohexanone is proportional to the amount of aldehyde used. The preferred molar ratio of aldehyde to the cyclohexanone is from 0.1:1 to 3:1. The particularly preferred ratio is from 0.5:1 to 2:1.

The reaction can be conducted at subatmospheric pressures up to superatmospheric pressures. It is preferred to employ atmospheric pressures for economical reasons.

The time necessary to carry out the reaction is obviously dependent on the rate in which the aldehyde and/or the oxygen is fed. The time is not critical and periods in the range of from 2 to 10 hours have been used. It is to be understood that longer or shorter periods can be used.

The reaction product may be separated into its components by any conventional method such as distillation, extraction etc.

The lactones produced by the instant process are useful in the production of polyester gum stocks and cured elastomers which are superior to conventional polyester gum stocks and elastomers. These compounds also have outstanding utility for the production of epsilon halocaproic acids.

The following examples illustrate the novel process of this invention.

EXAMPLE 1

*Using Propionaldehyde as Co-Reactant*

The reactor for this experiment was a 3-liter flask equipped with thermometer, stirrer, reflux condenser and diffuser through which oxygen was admitted. Effluent gas from the reaction was vented through the condenser to allow the condensation of any liquid vaporized from the reaction mixture.

To the flask there was charged 500 g. of cyclohexanone contaniing 0.076 g. of Cobalt Nuodex. (Cobalt Nuodex is a commercial product manufactured by Nuodex Products Co., Elizabeth, N.J., which is a solution of cobalt naphthenate containing six percent of cobalt.) While oxygen was passed through the liquid at a good rate there was fed a mixture of 500 g. of propionaldehyde and 1000 g. of ethyl acetate to which 0.228 g. of Cobalt Nuodex was added. The cobalt content of the reaction mixture was 9 parts per million. This mixture was fed in over a period of 6 hours and the temperature was maintained between 35 and 40° C. during the feed period.

The mixture was analyzed using a gas chromatograph and it was indicated that the conversion of cyclohexanone to caprolactone was 33 percent, and that the lactone to acid ratio was 0.23.

The product mixture was then distilled. Ethyl acetate and propionic acid were removed at reduced pressure in such a manner that the kettle temperature did not rise above 54° C. Cyclohexanone was then distilled off at a head temperature of 25° C. at 4 mm. At the conclusion of this cut the kettle temperature rose to a maximum of 108° C. epsilon. Caprolactone was then removed at a head temperature of 75° C./3 mm. A total of 173 g. of 99 percent pure lactone was obtained. In addition to the lactone there was also isolated 19 g. of adipic acid and 50 g. of a residue which was largely low-molecular weight polycaprolactone. The efficiency from cyclohexanone to distilled caprolactone was 74 percent.

EXAMPLE 2

*Using Butyraldehyde as Co-Reactant*

To a reactor similar to that used in Example 1 there was charged 500 g. of cyclohexanone to which 0.076 g. of Cobalt Nuodex solution had been added. This provided a cobalt concentration of 2 parts per million in the final mixture. While oxygen was bubbled through the liquid at a good rate there was fed a mixture of 1000 g. ethyl acetate and 500 g. of butyraldehyde. The feed period was five hours and the temperature was held at 35° to 42° C. during the run.

The material was distilled at reduced pressure. After the unreacted cyclohexanone and butyric acid were removed there was obtained 216 g. of distilled caprolactone of good purity. There were also recovered 33 g. of adipic acid and 45 g. of a low molecular weight polymer of caprolactone.

The conversion of cyclohexanone to caprolactone was 37 percent and the efficiency was 75 percent.

EXAMPLE 3

*Using 2-Ethylbutyraldehyde as Co-Reactant*

To a reactor similar to that described in Example 1 there was charged 75 g. of cyclohexanone containing 0.076 of cobalt Nuodex solution. This provided a cobalt concentration of 20 parts per million. While oxygen was passed through the liquid a mixture of 75 g. of 2-ethylbutyraldehyde and 75 g. of ethyl acetate was fed over 3½ hours while the temperature was held at 38° to 44° C. At the conclusion of the reaction the product was analyzed using the gas chromatograph. The indicated conversion of cyclohexanone to caprolactone was 33 percent. The ratio of lactone to acid to acid was 0.43.

EXAMPLE 4

*Using Valeraldehyde as Co-Reactant*

To a reactor similar to that described in Example 1 there was charged 75 g. of cyclohexanone to which 0.076 g. of cobalt Nuodex was added. This provided a cobalt concentration of 20 parts per million based on total weight of reactants. While oxygen was bubbled through the liquid at a good rate there was fed a mixture of 75 g. of valeraldehyde and 75 g. of ethyl acetate. The temperature ranged from 36° to 42° C. and the addition period required three hours. Analysis of the product mixture on the gas chromatograph indicated a conversion of cyclohexanone to caprolactone of 22 percent.

EXAMPLE 5

*Using Hexaldehyde as Co-Reactant*

To a reactor similar to that described in Example 1 there was charged 75 g. of cyclohexanone to which was added 0.076 g. of cobalt Nuodex solution. This provided a cobalt concentration of 20 parts per million based on total weight of reactants. While oxygen was bubbled through the liquid, there was fed a mixture of 75 g. of hexaldehyde and 75 g. of ethyl acetate. The feed time required 3½ hours and the temperature was maintained between 35° and 45° C. during the addition. Analysis of the product on the gas chromatograph indicated a conversion of cyclohexanone to epsilon-caprolactone of 28 percent.

EXAMPLE 6

*Using Propionaldehyde as Co-Reactant and Air as Oxidizing Agent*

To a reaction similar to the one described in Example 1 there was charged 75 g. of cyclohexanone to which 0.038 g. of cobalt Nuodex solution was added. This provided 0.8 parts per million cobalt based on total weight of material. Air was used as the oxidizing agent and was passed through the liquid at a good rate while there was fed a mixture of 75 g. of propionaldehyde and 150 g. of ethyl acetate. The temperature was held at 30° to 42° C. during the addition which required three hours. Analysis of the product at the completion of the reaction indicated a conversion of cyclohexanone to carprolactone of 14 percent.

EXAMPLE 7

*Example Showing Effective Use of Acetaldehyde as Co-Reactant*

To a 5 liter flask equipped with stirrer, thermometer, feed tank, oxygen inlet line and reflux condenser there was charged 600 g. of cyclohexanone to which 0.328 g. of cobalt Nuodex was added. Since the cobalt Nuodex contained 6 percent cobalt this represented 0.0197 g. of cobalt which was 5½ parts per million based on the total weight of reactants. While the liquid was stirred and oxygen was passed through it at the rate of 220 liters per hour a solution of 240 g. of acetaldehyde and 2760 ethyl acetate was fed over a period of 3 hours. After the feed was in, the oxygen flow was maintained for an hour. The product was distilled and there was obtained 187 g. of caprolactone, 22 g. of adipic acid and 39 g. of high boiling residue. The yield to distilled lactone from starting cyclohexanone was 26.8 percent and the efficiency was 77.3 percent. The combined efficiency to caprolactone plus adipic acid was 82.3 percent.

EXAMPLE 8

*Use of Vanadium as Catalyst*

To a one liter flask equipped with stirrer, thermometer, reflux condenser and inlet oxygen line there was charged 50 g. of cyclohexanone and 0.1 g. vanadium acetate. The contained vanadium was 75 parts per million based on total weight of reactants. While oxygen was passed through the stirred liquid at the rate of 26 liters per hour there was fed dropwise a solution of 50 g. of acetaldehyde in 200 g. ethyl acetate. The addition required 3 hours and the temperature was maintained at 39° to 45° C. After the feed was in the oxygen flow was maintained for 30 minutes. The product was analyzed and the indicated yield to caprolactone was 15.5 percent.

EXAMPLE 9

*Use of Ruthenium Catalyst*

To a reactor similar to that described in Example 8 there was charged 50 g. of cyclohexanone. To this there was added 1 g. of 5 percent ruthenium oxide on alumina. Based on the total charge the amount of ruthenium used was 166 parts per million. While oxygen was passed through the liquid at the rate of 26 liters per hour and the temperature was maintained at 42° to 48° C. a solution of 50 g. of acetaldehyde in 200 g. of ethyl acetate was fed dropwise over a period of 2½ hours. The oxygen flow was continued for another hour after the feed was in. Analysis by vapor phase chromatography indicated that caprolactone had been formed from cyclohexanone in 19.9 percent yield.

EXAMPLE 10

*Use of Palladium Catalyst*

To a reactor similar to that described in Example 8 there were charged 50 g. of cyclohexanone and 0.5 g. of 5% palladium oxide on charcoal. The contained palladium based on total weight of reactants was 83 parts per million. While oxygen was passed through the liquid at the rate of 26 liters per hour and the temperature was held at 45° C. a mixture of 50 g. of acetaldehyde and 200 g. of ethyl acetate was fed over 2½ hours. After the feed was in the oxygen flow was continued for an additional hour. The product was analyzed and the yield to caprolactone was found to be 18 percent.

EXAMPLE 11

*Use of Zirconium Catalyst*

To a reactor similar to that used in Example 8 there was charged 75 g. of cyclohexanone and enough zirconium tetra acetyl acetonate to give 10 parts per million of zirconium based on the total charge of material. While oxygen was passed through the liquid at the rate of 26 liters per hour and the temperature was held at 40–44° C. a solution of 75 g. of acetaldehyde in 300 g. of ethyl acetate was fed dropwise over 2½ hours. The oxygen flow was maintained for another ½ hour after the feed was in. The product was analyzed by gas chromatography and the indicated yield of caprolactone was 14.3 percent.

EXAMPLE 12

*Aluminum Catalyst*

To a reactor similar to that described in Example 8 there were charged 75 g. of cyclohexanone and enough aluminum acetate to provide 20 parts per million of aluminum based on the total weight of material used in the experiment. While the temperature was held at 40–42° C. and oxygen was passed through the liquid at the rate of 26 liters per hour a solution of 75 g. of acetaldehyde in 300 g. ethyl acetate was fed dropwise over a 3 hour period. After the feed was in the oxygen flow was continued for an additional ½ hour. The material was analyzed and the yield of caprolactone was found to be 12.2%.

EXAMPLE 13

*Antimony Catalyst*

To a reactor similar to that described in Example 9 there were charged 75 g. of cyclohexanone and enough antimony trioxide to provide 75 parts per million based on the total weight of material used in the experiment. While the temperature was held at 39 to 42° and oxygen was passed through the liquid at the rate of 26 liters per hour there was fed a solution of 75 g. of acetaldehyde in 300 g. of ethyl acetate over a 4 hour period. Analysis of the product indicated a yield of 10.5% of caprolactone from the starting cyclohexanone.

EXAMPLE 14

*Beryllium Catalyst*

To a reactor similar to that described in Example 8 there was charged 75 g. of cyclohexanone and enough beryllium nitrate to provide 5 parts per million of beryllium based on the total charge. While oxygen was passed through the liquid at the rate of 26 liters per hour and the temperature was maintained at 38 to 42° C., a solution of 75 g. of acetaldehyde in 300 g. of ethyl acetate was fed dropwise over a period of 3 hours. After the feed was in, the oxygen flow was maintained for an additional 30 minutes. Analysis of the product indicated a yield of 7.5 percent of caprolactone from the starting cyclohexanone.

The following example illustrates the effect of increasing the ratio of aldehyde to ketone.

EXAMPLE 15

*Using 2-Ethylbutyraldehyde as Co-Reactant Showing the Effect of Increasing Aldehyde to Cyclohexanone Ratio*

To a reactor similar to that described in Example 1 there was charged 75 g. of cyclohexanone to which four drops of cobalt Nuodex had been added. While oxygen was bubbled through the liquid at a good rate there was fed a mixture of 150 g. of 2-ethylbutyraldehyde and 150 g. of ethyl acetate over a six hour period. The temperature was held in the range of 32 to 40° C. during the addition.

At the conclusion of the reaction the product mixture was analyzed by means of the gas chromatograph. The indicated conversion of cyclohexanone to epsilon-caprolactone was 61 percent and the lactone to acid ratio was 0.41.

The following examples illustrate that reaction will not proceed in absence of a catalyst.

EXAMPLE 16

*No Catalyst*

A reactor similar to that used in Example 8 was treated with 20 percent nitric acid to remove any metal salts that might be present. To the reactor there was then charged 200 g. of cyclohexanone. While the temperature was held at 30° C. oxygen was passed through the liquid at the rate of 31 liters per hour and a solution of 200 g. of acetaldehyde in 200 g. of ethyl acetate was fed dropwise over a 2½ hour period. After the feed was in the oxygen flow was maintained for another 30 minutes. The product was then analyzed and found to contain no caprolactone. About 25 percent of the acetaldehyde used had been oxidized to acetic acid.

EXAMPLE 17

*No Catalyst But With Metal Getter Present*

To a reactor similar to that described in Example 8 there was charged 75 g. of cyclohexanone to which has been added 0.45 g. of dioctyl hydrogen pyrophosphate. While the temperature was maintained at 40 to 45° C. and oxygen was passed through the liquid at a good rate there was fed dropwise a solution of 75 g. acetaldehyde in 300 g. ethyl acetate over a 3 hour period. The product was analyzed and about 40 percent of the acetaldehyde was found to have been oxidized to acetic acid. However no caprolactone was formed in the reaction.

The following example illustrates that the reaction will not proceed when the catalyst concentration is outside the critical limits.

EXAMPLE 18

*Use of Very Small Amount of Catalyst*

To a 5 liter reaction flask of the same type as that described in Example 8 there was charged 600 g. of cyclohexanone to which enough manganese Nuodex had been added to provide 0.01 part per million of manganese based on the total weight of material used in the experiment. While the temperature was maintained at 32 to 35° C. oxygen was sparged through the liquid at the rate of 180 liters per hour and a solution of 600 g. of acetaldehyde in 2400 g. of ethyl acetate was fed dropwise over a 3 hour period. After the feed was in, the oxygen flow was continued for another 30 minutes. The product was analyzed and it was found that about two-thirds of the acetaldehyde had been oxidized to acetic acid. However no caprolactone was present.

The following examples illustrate that the temperature is critical.

EXAMPLE 19

*Run Made at Temperature Above the Preferred Range*

To an apparatus similar to that used in Example 8 there was charged 75 g. of cyclohexanone to which 0.038 g. of cobalt Nuodex solution had been added. This was enough to provide 5 parts per million of cobalt based on the total weight of material used in the experiments. While $O_2$ was passed through the liquid at a good rate and the temperature was maintained in the range of 87 to 93° C. there was fed dropwise a solution of 75 g. of 2-ethyl butyraldehyde in 300 g. of butyl acetate over a 2½ hour period. After the feed was in, the oxygen flow was maintained for an additional 50 minutes. Analysis of the product showed that no caprolactone had been formed in the oxidation.

EXAMPLE 20

*Run Made at Temperature Below the Preferred Range*

To a reactor similar to that described in Example 8 there was charged 75 g. of cyclohexanone to which enough manganese Nuodex had been added to provide 10 parts per million of manganese based on the total weight of material used in the experiment. While oxygen was passed through the liquid at a good rate the temperature was maintained at 10° C. to 14° C. and a solution of 75 g. of acetaldehyde in 300 g. of ethyl acetate was fed dropwise over a period of 2½ hours. After the feed was in, the oxygen flow was continued for an additional 30 minutes. The product solution was analyzed by the vapor phase chromatograph and it was found that no caprolactone had been formed.

In the above examples:

Percent conversion
$$= \frac{\text{moles of caprolactone formed}}{\text{moles of cyclohexanone charged}} \times 100$$

Percent efficiency
$$= \frac{\text{moles of caprolactone formed}}{\text{total moles of cyclohexanone reacted}} \times 100$$

$$\text{Lactone to acid ratio} = \frac{\text{moles of caprolactone formed}}{\text{moles acid formed}}$$

What is claimed is:

1. The process of reacting a cyclohexanone of the formula:

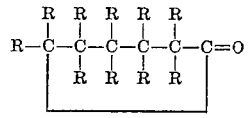

wherein R is selected from the group consisting of hydrogen and alkyl having from 1–30 carbon atoms, with an oxygen-containing gas and an aldehyde selected from the group consisting of benzaldehyde, phthalaldehyde, tolualdehyde and aldehydes of the formula:

wherein R' is selected from the group consisting of hydrogen and alkyl of from 1–30 carbon atoms at a temperature of from 20–80° C. in contact with a salt of a metal selected from the group consisting of ruthenium, platinum and palladium, there being present from 10 to 500 parts per million of said metal based on the weight of total reactants.

2. The process of reacting a cyclohexanone of the formula:

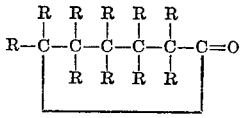

wherein R is selected from the group consisting of hydrogen and alkyl having from 1–30 carbon atoms, with an oxygen-containing gas and an aldehyde selected from the group consisting of benzaldehyde, phthalaldehyde, tolualdehyde and aldehydes of the formula:

R'CHO wherein R is selected from the group consisting of hydrogen and alkyl of from 1–30 carbon atoms at a temperature of from 20–80° C. in contact with a salt of a metal selected from the group consisting of antimony and beryllium, there being present 10–200 parts per million of said metal based on the weight of the total reactants.

3. The process of reacting a cyclohexanone of the formula:

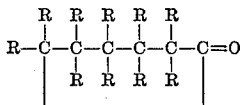

wherein R is selected from the group consisting of hydrogen and alkyl having from 1–30 carbon atoms, with an oxygen-containing gas and an aldehyde selected from the group consisting of benzaldehyde, phthalaldehyde, tolualdehyde and aldehydes of the formula:

R'CHO wherein R' is selected from the group consisting of hydrogen and alkyl of from 1–30 carbon atoms at a temperature of from 20–80° C. in contact with a metal salt of vanadium, there being present 5–200 parts per million of vanadium based on the weight of the total reactants.

4. The process of reacting a cyclohexanone of the formula:

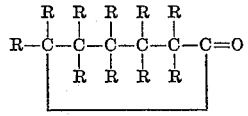

wherein R is selected from the group consisting of hydrogen and alkyl having from 1–30 carbon atoms, with an oxygen-containing gas and an aldehyde selected from the group consisting of benzaldehyde, phthalaldehyde, tolualdehyde and aldehydes of the formula:

R'CHO wherein R' is selected from the group consisting of hydrogen and alkyl of from 1–30 carbon atoms at a temperature of from 20–80° C. in contact with a salt of a metal selected from the group consisting of zirconium and copper, there being present 2–200 parts per million of said metal based on the weight of the total reactants.

5. The process of reacting a cyclohexanone of the formula:

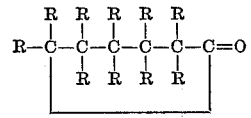

wherein R is selected from the group consisting of hydrogen and alkyl having from 1–30 carbon atoms, with an oxygen-contacting gas and an aldehyde selected from the group consisting of benzaldehyde, phthalaldehyde, tolualdehyde and aldehydes of the formula:

R'CHO wherein R' is selected from the group consisting of hydrogen and alkyl of from 1–30 carbon atoms at a temperature of from 20–80° C. in contact with a salt of aluminum, there being present 1–100 parts per million of aluminum based on the weight of the total reactants.

6. The process of reacting a cyclohexanone of the formula:

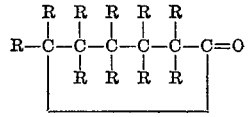

wherein R is selected from the group consisting of hydrogen and alkyl having from 1–30 carbon atoms, with an oxygen-containing gas and an aldehyde selected from the group consisting of benzaldehyde, phthalaldehyde, tolualdehyde and aldehydes of the formula:

R'CHO wherein R' is selected from the group consisting of hydrogen and alkyl of from 1–30 carbon atoms at a temperature of from 20–80° C. in contact with a salt of cobalt, there being present 0.1–50 parts per million of cobalt based on the weight of the total reactants.

7. The process of reacting a cyclohexanone of the formula:

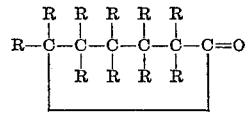

wherein R is selected from the group consisting of hydrogen and alkyl having from 1–30 carbon atoms, with an oxygen-containing gas and an aldehyde selected from the group consisting of benzaldehyde, phthalaldehyde, tolualdehyde and aldehydes of the formula:

R'CHO wherein R' is selected from the group consisting of hydrogen and alkyl of from 1–30 carbon atoms at a temperature of from 20–80° C. in contact with a salt of manganese, there being present 0.1–20 parts per million of manganese based on the weight of the total reactants.

8. The process of reacting cyclohexanone, acetaldehyde and oxygen-containing gas at a temperature of from 20–80° C. in contact with a salt of manganese, there being present 0.1–20 parts per million of said manganese based on the weight of the total reactants.

9. The process of reacting a cyclohexanone, acetaldehyde and an oxygen-containing gas at a temperature of from 20–80° C. in contact with a salt of cobalt, there being present 0.1–50 parts per million of cobalt based on the weight of the total reactants.

10. The process of reacting a cyclohexanone, propionaldehyde and an oxygen-containing gas at a temperature of from 20–80° C. in contact with a salt of cobalt, there being present 0.1–50 parts per million of cobalt based on the weight of the total reactants.

References Cited in the file of this patent

UNITED STATES PATENTS 2,245,528    Loder                June 10, 1941

OTHER REFERENCES

Fuson: Advanced Organic Chemistry, Wiley, New York, N.Y. (1950), pages 225 and 226.

Gilman: Organic Chemistry, Wiley, New York, N.Y., vol. IV, (1950), pages 1169–1171.